Figure 1:
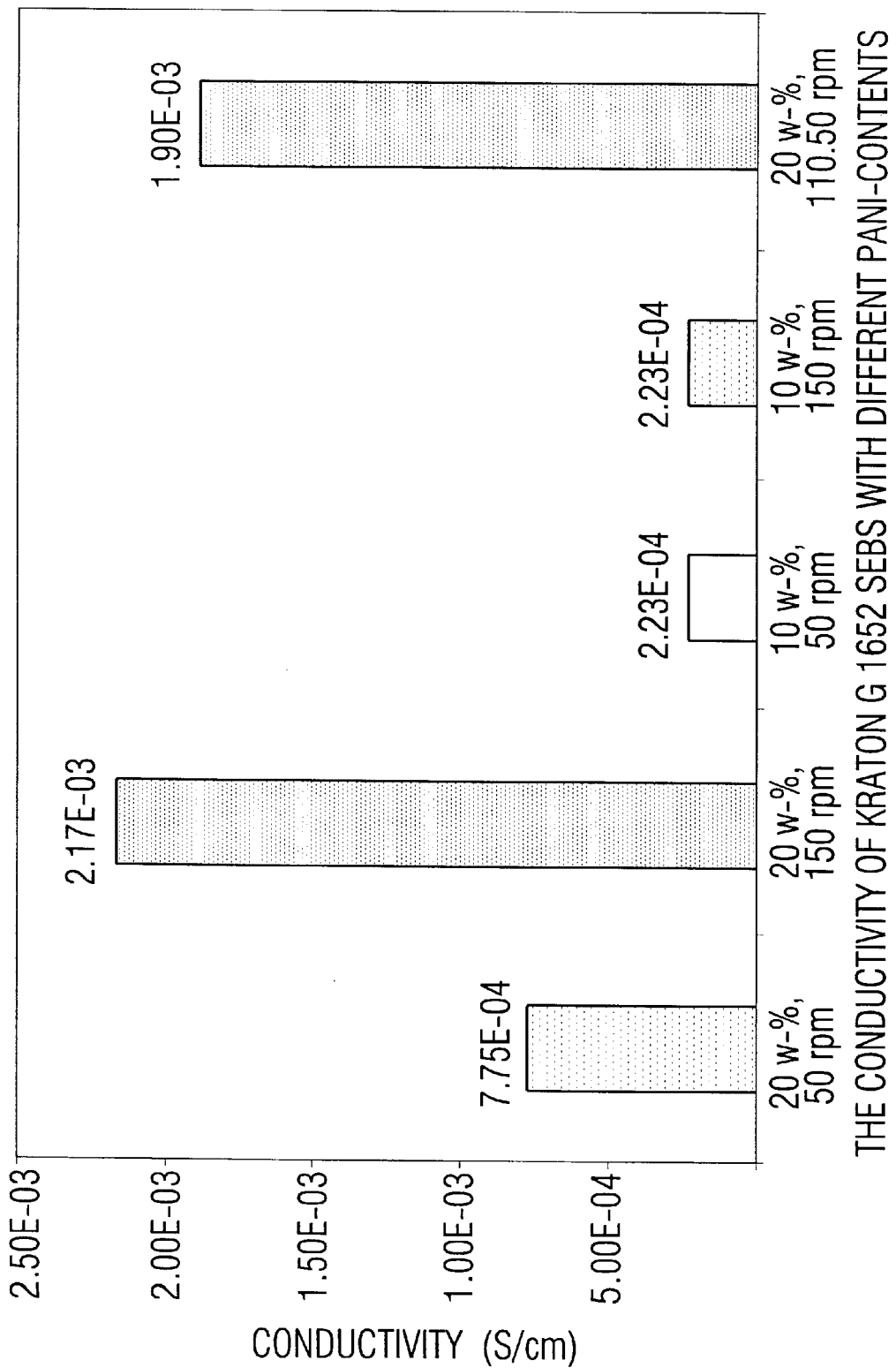

United States Patent
Hanhi et al.

[11] Patent Number: 5,993,696
[45] Date of Patent: Nov. 30, 1999

[54] ELECTRICALLY CONDUCTIVE THERMOPLASTIC ELASTOMERIC COMPOSITION AND ITS USE

[75] Inventors: Kalle Hanhi, Nokia; Viveca Lönnberg, Box; Keijo Pyörälä, Espoo, all of Finland

[73] Assignee: Optatech Oy, Espoo, Finland

[21] Appl. No.: 09/000,237

[22] PCT Filed: Aug. 12, 1996

[86] PCT No.: PCT/FI96/00433

§ 371 Date: Apr. 9, 1998

§ 102(e) Date: Apr. 9, 1998

[87] PCT Pub. No.: WO97/06213

PCT Pub. Date: Feb. 20, 1997

[30] Foreign Application Priority Data

Aug. 10, 1995 [FI] Finland ................................. 953803

[51] Int. Cl.⁶ .................................................. H01B 1/20
[52] U.S. Cl. .................................................... 252/500
[58] Field of Search ................................. 252/500, 518, 252/519, 520, 521; 528/422; 264/104, 239

[56] References Cited

U.S. PATENT DOCUMENTS

| | | | |
|---|---|---|---|
| 5,340,499 | 8/1994 | Kärnä et al. | 252/500 |
| 5,346,649 | 9/1994 | Kärnä et al. | 252/500 |
| 5,531,932 | 7/1996 | Kärnä et al. | 252/518 |
| 5,585,038 | 12/1996 | Kirmanen et al. | 252/500 |

FOREIGN PATENT DOCUMENTS

| | | |
|---|---|---|
| 0 545 729 A1 | 6/1993 | European Pat. Off. . |
| 0 582 919 A3 | 2/1994 | European Pat. Off. . |
| 0 627 745 A1 | 12/1994 | European Pat. Off. . |
| 932578 | 12/1994 | Finland . |
| 923580 | 4/1995 | Finland . |
| 940621 | 8/1995 | Finland . |

OTHER PUBLICATIONS

Morton, M., Rubber Chemistry and Technology, vol. 56, May 10–12, 1983, pp. 1086–1110, "Structure–Property Relations in Amorphous and Crystallizable ABA Triblock Copolymers."

Holden, G., Bishop, E.T., Legge, N.R., J. Polymer Sci: Part C, No. 26, (1969), pp. 37–59, "Thermoplastic Elastomers."

Primary Examiner—Mark Kopec
Attorney, Agent, or Firm—Pennie & Edmonds LLP

[57] ABSTRACT

The invention comprises a thermoplastic elastomer blend which is composed of
a) about 10–90 w-% of a thermoplastic elastomer component which is chosen from the following ones:
  a styrene block copolymer of the type A-B-A, where A stands for a polystyrene block and B stands for a soft or elastic polymer block;
  a blend of an olefin homopolymer or olefin copolymer with a thermoplastic or crosslinked elastomer, and
b) about 90–1 w-% of an inherently electrically conductive polymer component comprising polyaniline or its derivative which has been doped by a protonic acid.

29 Claims, 3 Drawing Sheets

THE CONDUCTIVITY OF KRATON G 1652 SEBS WITH DIFFERENT PANI-CONTENTS

THE CONDUCTIVITY OF SANTOPRENE 64 ShA AND 80 ShA WITH DIFFERENT PANI-GRADES AND -CONTENTS. SCREW ROTATION SPEED 150 RPM

ELECTRICALLY CONDUCTIVE THERMOPLASTIC ELASTOMERIC COMPOSITION AND ITS USE

The invention is related to electrically conductive elastomer alloys and their use as antistatic materials and/or EMI shielding materials.

A lot of research work in the area of electrically conductive polymers is done at the moment all around the world. These polymers make it possible to replace metallic conductors and semi-conductors in many applications like batteries, transducers, switches, solar cells, circuit boards, heating elements and in electrostatic discharge (ESD) and electromagnetic interference shielding (EMI) applications.

The advantages of electrically conductive polymers compared to metals are for instance their low weight, good mechanical properties, corrosion resistance and cheaper synthesis and processing methods.

Electrically conductive polymers can be roughly divided in two different categories: filled electrically conductive plastics, which are composed of thermoplastics or thermosets containing electrically conductive fillers like carbon black or soot, carbon fibres, metal powder, etc. and inherently electrically conductive plastics, which are based on polymers that are made electrically conductive by oxidation or reduction (doping).

The electrical conductivity of filled electrically conductive plastics depends on the physical contacts between the electrically conductive filler particles. In general one needs about 10–50 w-% of well dispersed fillers in order to obtain composites with good conductivity. However, there are problems with such conductive composites: their mechanical and some chemical properties disimprove considerably when increasing the filler content and the electrical conductivity is difficult to control especially in the semiconductive region when the polymer content decreases. Also a long lasting and homogenous dispersion of fillers into the matrix plastic is difficult to obtain.

Inherently electrically conductive plastics can be made from organic polymers, in which there are long chains with conjugated double bonds or double bonds and hetero-atoms. The stable $\pi$- and $\pi$-p-electron-systems in the double bonds and hetero-atoms can be disturbed by adding to the polymer certain doping agents or additives which either attract or repell electrons. In this way holes and/or excess electrons are obtained in the polymer chain, which make it possible for an electrical current to go along the conjugated chain.

An advantage with the inherently electrically conductive polymers is that their electrical conductivity is easily varied as a function of the doping time, which is especially seen in the case of low conductivities. It is difficult to obtain low conductivities for filled electrically conductive plastics. Examples of inherently electrically conductive polymers are polyacetylene, poly-p-phenylene, polypyrole, polythiophene and polyaniline.

One technically and commercially promising inherently electrically conductive polymer is polyaniline and its derivatives. The aniline polymer is based on an aniline unit, the nitrogen atom of which is bonded to the paracarbon of the benzene ring of the next unit. Non-substituted polyaniline can appear in many forms like the leukoemeraldine, protoemeraldine, emeraldine, nigraniline and toluprotoemeraldine forms.

The so called basic emeraldine form of polyaniline is normally described by molecular model (I)

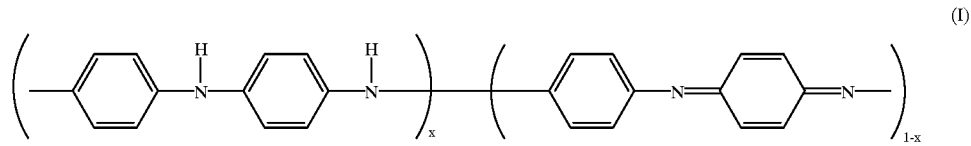

in which X is about 0.5.

In patent applications EP-545 729 and EP-582 919 polyaniline and its derivatives have been obtained in an easily melt processable form by contacting polyaniline or its derivative and a protonic acid under high shear forces and a temperature of about 80–300° C. Furthermore in the latter patent application EP-582919 the product based on polyaniline and a protonic acid has been improved by permanently adding a metal compound. In the same patent application it has also been suggested that the electrically conductive and melt processable polyaniline polymer obtained is mixed with a thermoplastic in order to form an electrically conductive plastic blend. Thermoplastic blends which have been mentioned are the olefinic polymers, styrenic polymers, vinyl polymers, acrylic polymers and the thermoplastic polycondenzation polymers.

In patent application EP-582 919 mentioned above one also considered the possibility that polyaniline or its derivatives which have been doped with a protonic acid in the manner explained could be contacted with a thermoplastic elastomer in order to obtain an electrically conductive plastic mixture or blend. It was considered to be no problems to combine the electrically conductive and melt processable polyaniline products with a thermoplastic elastomer component. However, in the preliminary tests it was found that it was very problematic to obtain a thermoplastic blend of an electrically conductive polymer and an elastomer.

The aim with this invention was to obtain an electrically conductive and thermoplastic elastomer blend in which an electrical conductivity of the ESD and EMI level is combined with good mechanical and chemical properties. The objective was also to obtain a homogenous plastic product in which all components are compatible and melt processable.

The objectives mentioned above have now been reached with a new type of electrically conductive and melt processable elastomer blend which is mainly characterized by the following composition:

a) about 10–89 w-% of a thermoplastic elastomer component which has been chosen from the following types:
   A styrene-block-copolymer of the A-B-A-type, in which A means a polystyrene-block and B means a soft or elastic polymer-block:
   A blend of an olefinic homo- or co-polymer and a crosslinked elastomer,
   and
b) about 90–1 w-% of an inherently electrically conductive polymer component, which is composed of polyaniline or its derivative which has been doped with a protonic acid.

In general an electrically conductive component means a complex based on polyaniline or its derivative as it has been defined in the publications EP-627 745 and EP-582 919 which are enclosed as references.

It was realised that an electrically conductive thermoplastic elastomer blend can be obtained with very specific combinations, namely by combining an A-B-A-type styrene-block-copolymer and polyaniline doped with a protonic acid or by combining an olefinic type of elastomer and polyaniline doped with a protonic acid The other types of thermoplastic elastomer components cannot at all be combined with polyaniline which has been doped with a protonic acid and their mixtures or blends are not electrically conductive. Such specific combinations could not be foreseen based on the publication FI-923 580.

The preferred amount of polyaniline or its derivative doped with a protonic acid which can be added to the invented electrically conductive thermoplastic elastomer blend is between 90–5 w-%. It is, however, more preferred if this amount is 40–10 w-% which causes very useful elastomer materials for ESD and EMI applications.

As mentioned the elastomer component of the invented electrically conductive thermoplastic elatomer blend can be an A-B-A-type styrene-block-copolymer in which A means a polystyrene block and B means a soft or elastic polymer block. Covered by the patent application are in principal all styrene-block-copolymers of this type. These are more closely described in the publications Morton, M., Rubber Chem. Technol., 56, 1096 (1983). According to one of the possibilities the elastomer component a) has been chosen from the following group of A-B-A-type styrene-block copolymers: A is a polystyrene-block and B is a polybutadiene-block (SBS); A is a polystyrene-block and B is a polyisoprene-block (SIS); A is a polystyrene-block and B is a poly (ethylene-co-butylene) block (SEBS); A is a polystyrene-block and B is a polydimethylsiloxane-block; in all cases A can also be a poly ($\alpha$-methyl-styrene) block.

According to one favourable possibility of the invention the electrically conductive thermoplastic elastomer blend contains as the elastomer component a) an A-B-A-type of styrene-block-copolymer in which A is a polystyrene block and B is a poly (ethylene-co-butylene) block (SEBS).

According to another possibility of the invention the electrically conductive thermoplastic elastomer blend contains as the elastomer component a) a blend of an olefin homopolymer or olefin copolymer with a crosslinked elastomer. The word "crosslinked" means a polymer in which the macromolecules have been linked to each other to form a network either physically, (for instance by crystallization) or chemically (for instance by covalent bonds). Such a polymer is favourably chosen from the following group: a blend of a polypropylene homopolymer or copolymer and an ethylene-propylene rubber (EPR); a blend of a polypropylene homopolymer or copolymer and an ethylene-propylene-diene rubber (EPDM); a blend of a polypropylene homopolymer or copolymer and an acrylate-rubber; and a blend of a polyethylene homopolymer or copolymer and an acrylate-rubber; in all of which the rubber can be either physically or chemically crosslinked. According to one favourable case the elastomer component a) is a blend of a polypropylene homopolymer and an ethylene-propylene-diene rubber (EPDM), in which the rubber is crosslinked (vulcanized). In this case the electrically conductive polymer component dissolves in the polypropylene phase whereby better homogeneity and higher conductivity are obtained with smaller contents.

According to one most favourable possibility of the invention the electrically conductive thermoplastic elastomer blend has got an elastomer component a) which in a blend of an olefin homopolymer or an olefin copolymer and a crosslinked acrylate rubber. The olefin homopolymer or copolymer component of this blend can for instance be high density polyethylene (HDPE), low density polyethylene (LDPE) and linear low density polyethylene (LLDPE). Polyethylene may also contain small amounts of other monomers than ethylene. Among useful ethylene copolymers one should mention the ones in which the comonomer is vinylacetate, vinylchloride, propylene or some other $\alpha$-olefin, $C_1$–$C_7$-alkylacrylates or -methacrylates, acrylic acid and methacrylic acid, hydroxyalkylacrylate or -methacrylate, glycidylacrylate or -methacrylate, a diene like 1,4-hexadiene, 1,5-hexadiene, 1,6-hexadiene, 1,4-2-methylpentadiene 1,7-octadiene, 1,5-6-methylhexadiene or octatriene or polyenes of the bicyclopentadiene type.

Also an ethylene-$\alpha$-olefin-polyene-terpolymer is suitable as the olefin copolymer component for a olefin copolymer acrylate rubber blend. As a preferred $\alpha$-olefin-monomer for such a terpolymer one can mention propylene, butylene, pentene, isoprene, hexene or any combination of these and as a pre-ferred polyenemonomer one can mention 1,4-hexadiene, 1,5-hexadiene, 1,6-heptadiene, 1,4-2-methylpentadiene, 1,7-octadiene, 1,5-6-methylheptadiene, octatriene and bicyclopentadiene. In case of an ethylene copolymer the ethylene content must be at least 50 w-% of the copolymer.

When the elastomer component a) of the invented electrically conductive thermo-plastic elastomer blend is a blend of an olefin polymer and an acrylate rubber the olefin polymer component can also be polypropylene or a propylene copolymer. Among the comonomers one can mention the aforementioned comonomers which can be used together with ethylene. It is important that the concentration of propylene in the propylene copolymer is over 50% by weight. Furthermore one should mention the random copolymers and blockcopolymers of propylene and ethylene.

Most preferred elastomer components a) of the invented electrically conductive thermoplastic elastomer blend are: a blend of poly(ethylene-co-vinylacetate) and acrylate rubber; a blend of poly (ethylene-co-butyl-acrylate) and acrylate rubber; a blend of linear low density polyethylene (LLDPE) and acrylate rubber as well as a blend of polypropylene random copolymer and acrylate rubber.

The acrylate rubber of aforementioned elastomer component a) is preferably such an acrylate or methacrylate copolymer that has a low glass transition temperature. It is preferred to have a glass transition temperature below +20° C. and most preferred if it is below −20° C. The glass transition temperature of the acrylate polymer determines the lower use temperature of the material, because below the glass transition temperature the acrylate polymer is hard and non-elastic, so that the material loses its elastomeric properties. It is preferred to have an acrylate rubber containing $C_1$–$C_{12}$- or more preferred $C_2$–$C_{12}$-alkylacrylates or alternatively $C_4$–$C_{14}$- or more preferred $C_8$–$C_{14}$-alkylmethacrylates. Most preferred such acrylate rubbers are ethylhexylacrylate polymers and butylacrylate polymers.

The monomer of the acrylate rubber can be used alone or as mixtures of two or several. In addition to the acrylate monomers mentioned above one can also use smaller amounts of monomers with alkylgroups containing less carbon atoms. In this way one can regulate the glass transition temperature of the final product. As comonomers one can also use such acrylates and methacrylates which in addition to the ester bond contain other polar groups, like alkoxy or hydroxy groups. As examples one can mention methoxy- and ethoxyethylacrylate, methoxy- and ethoxybutylacrylate, hydroxyethyl- and hydroxypropyl methacrylate etc. By using such comonomers one can improve the oil resistance of the product. When making acrylate rubber one can also use comonomers which are not acrylates.

When the elastomer component of the invented electrically conductive thermoplastic elastomer blend is a) a blend of olefin homopolymer or olefin copolymer and acrylate rubber it is advantageous that the portion of acrylate rubber is about 20–90 w-% of the combined weight of olefin homopolymer or olefin copolymer and acrylate rubber. When making elastomer components based on polypropylene it is advantageous to use 50–90 w-% acrylate rubber and when making elastomer components based on ethylene it is advantageous to use 50–90 w-% acrylate rubber for polyethylene homopolymers and named 20–90 w-% acrylate rubber for polyethylene copolymers.

One can also add oils and fillers to blends of olefin homopolymers or olefin copolymers and acrylate rubber. A normal way of making such an elastomer component a) which is composed of an olefin homopolymer or olefin copolymer and acrylate rubber is to impregnate the acrylate monomer and its initiating initiator into polyolefin particles after which their polymerisation is done at elevated temperature. If needed the acrylate rubber can be crosslinked by using small amounts of multifunctional acrylates like diacrylates together with the acrylate monomer. Then the other unsaturated group of the acrylate crosslinks the chains into a network. Typical crosslinkable acrylate comonomers of this kind are hexanedioldiacrylate or -dimethacrylate, butanedioldiacrylate or -dimethacrylate. The amount of crosslinkable monomer is normally 0–15 w-% of the total amount of acrylate.

The acrylate rubber is normally made by radical polymerisation and one can use as initiator normal peroxides and azo-compounds used in this field.

Above the invented electrically conductive thermoplastic elastomer blend and its component a) the thermoplastic elastomer component have been described. Below we are going to describe component b), the inherently electrically conductive polymer component. In this invention the inherently electrically conductive polymer component is composed of polyaniline or its derivative which has been doped by a protonic acid. As was mentioned in the introduction the aniline polymer is based on an aniline unit the nitrogen atom of which is bonded to the para carbon of the benzene ring of the next unit. The aniline polymer can be non-substituted or its benzene ring can have substituents. Non-substituted polyaniline can appear in several forms among which one can mention the leukoemeraldine, protoemeraldine, emeraldine, nigraniline and tolu-protoemeraldine forms. According to one preferable way of using the invention the inherently electrically conductive polymer component b) is composed of the emeraldine base form of polyaniline which has been doped by a protonic acid.

This emeraldine base form is normally described by the molecular structure (I).

The polyaniline used in the invention is doped by a protonic acid. The protonic acid can be any protonic acid which dopes polyaniline or its derivative. According to one way of using the invention the inherently electrically conductive polymer component b) is composed of polyaniline or its derivative, which has been doped by a protonic acid chosen from the following group: hydrochloric acid; sulphuric acid; nitric acid; perchloroacid, fluoroboric acid; hexafluorophosphoric acid; hydrofluoric acid; phosphoric acids; sulphonic acid; picric acid; m-nitrobenzoic acid; dichloroacetic acid. Preferable protonic acids are the organic sulphonic acids, more preferable the aromatic sulphonic acids and most preferable dodecyl-benzene-sulphonic acid (DBSA).

As was mentioned earlier the doping of polyaniline or its derivative by a protonic acid is preferably done by contacting polyaniline or its derivative and a protonic acid under high shear forces and at a temperature of about 80–300° C. Preferable machines which create high shear forces and elevated temperatures are the ones used in melt processing of plastics like kneaders, mixing extruders and mixers. The mixing temperature is preferably between 40–300° C., more preferably between 80–250° C. and most preferably 100–200° C. The molar ratio of polyaniline or its derivative and protonic acid is preferably between 1:0.1–1:1.1, more preferably between 1:0.5–1:0.7. The molar content of polyaniline or its derivative is calculated here as the number of aniline-units.

Component b) of the invented electrically conductive thermoplastic elastomer blend, the polyaniline or its derivative which has been doped by protonic acid, can according to one preferable way of making it also contain a metal compound which affects the protonic acid doped polyaniline or its derivative as a:

i) neutralizer
ii) plasticizer
iii) percolation point suppressor and/or
iv) stabilizer Here the percolation point is defined as the weight ratio of the conductive compound or component b) which is needed to provide the invented blend with component a) an electrical conductivity of at least $10^{-6}$ S/cm.

According to one definition of the invented electrically conductive thermoplastic elastomer blend it is a totally polymeric thermoplastic elastomer blend, which has a percolation point as low as about 10 w-%, both with and without the metal compound mentioned above.

The metal compound component of named component b) or the protonic acid doped polyaniline or its derivative is preferably a metal salt or a reaction product of a metal oxide or metal hydroxide and a protonic acid. The most preferable metal compound is the reaction product of zinc oxide and dodecylbenzenesulphonic acid (DBSA).

In principle the invented electrically conductive thermoplastic elastomer blend can be obtained by melt compounding together component a) which is a thermoplastic elastomer component and component b), which is a protonic

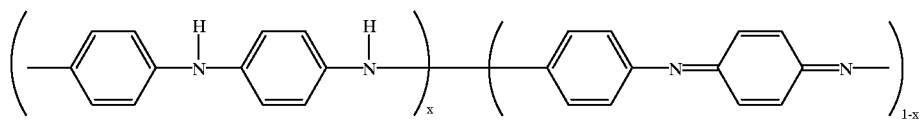

(I)

in which X is around 0.5.

acid doped polyaniline or its derivative and possibly one or several additives using any kind of melt compounding device. For this purpose one can use kneaders, mixers and mixing extruders. When using a thermoplastic elastomer component a) which is an A-B-A type of styrene-block copolymer the mixing can be preferably done with an extruder at about 160–210° C. and most preferably at a screw rotation speed of about 40–170 1/min.

When using a thermoplastic elastomer component a) which is an olefin homopolymer or copolymer the mixing can be preferably done with an extruder at a temperature of about 165–220° C. and most preferably at a screw rotation speed of about 50–200 1/min.

As was mentioned earlier the invented electrically conductive thermoplastic elastomer blend has such an electrical conductivity which makes it suitable for antistatic protection (ESD) and electromagnetic interference shielding (EMI). Therefore is the invention focusing on these end-uses and especially their applications as connectors, switches, contact mats, sensors as well as seals and electrically conductive rolls. Furthermore there are interesting applications like corrosion protection, glues and coatings, cable shielding as well as packaging, floor mats and other working surfaces and storing applications.

The invention is presented below with demonstration and reference examples and their only purpose is to describe the invention.

DEMONSTRATION AND REFERENCE EXAMPLES

Figure 2:
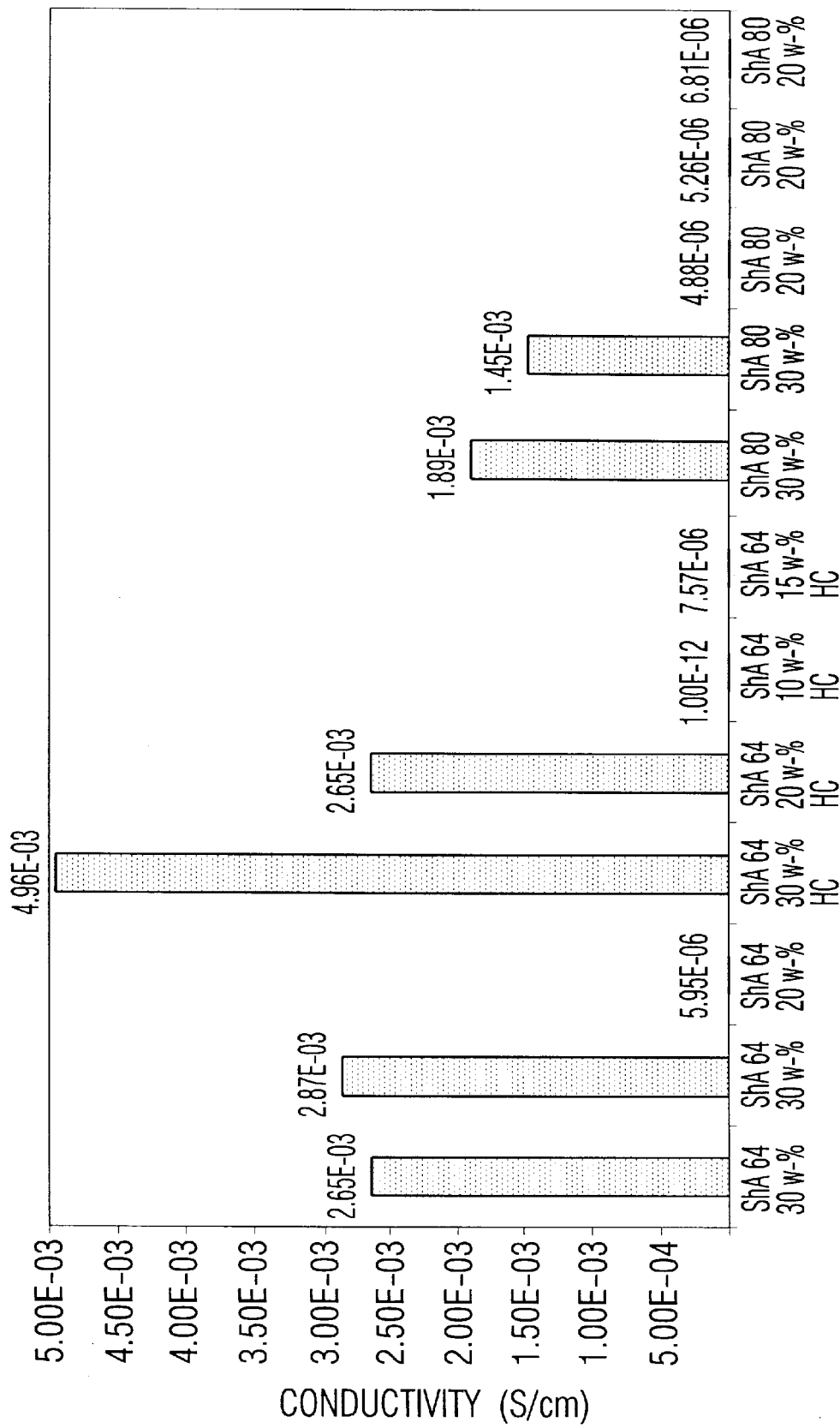
Figure 3:
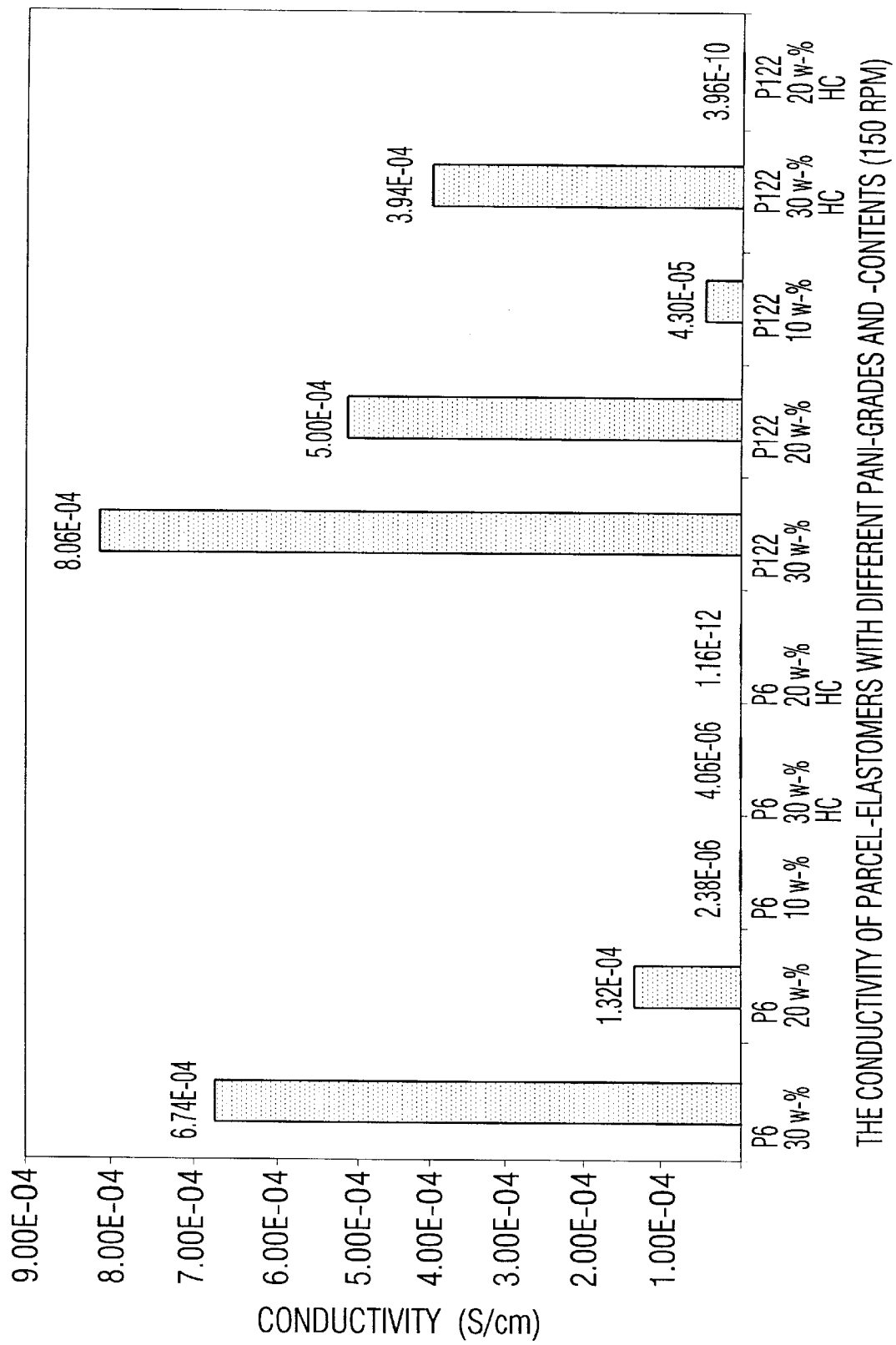

Below reference is made to the following figures:

FIG. 1 presents the conductivities of Kraton G 1652 SEBS with different PANI contents, FIG. 2 presents the conductivites of Santoprene 64 ShA and 80 ShA with different PANI grades and contents, and FIG. 3 presents the conductivities of PACREL elastomer with different PANI grades and contents.

1. Materials

Enclosed a list of selected elastomer matrixes (component a):

| | |
|---|---|
| ex. 1 and 7 (reference) | Copolyester - TPE (COPE), HYTREL (Du Pont) |
| ex. 2 and 8 (reference) | Polyurethane - TPE (TPU) ESTANE (BFGoodrich) |
| ex. 3 and 9 (performance) | PP/Vulcanized EPDM - TPE(TPV), SANTOPRENE - 64 (AES) |
| ex. 4 and 10 (reference) | Styrene block-co-polymer SEBS, KRATON G (Shell) |
| ex. 5 and 11 (reference) | Silicone (MQ), SILOPREN LSR (Bayer) |
| ex. 6a and 12a (performance) | EBA/pBA PACREL ® (Optatech) |
| ex. 6b and 12b (performance) | PP/pBA TPE PACREL ® (Optatech) |

TPE=thermoplastic elastomer
EPDM=ethylene-propylene-diene-monomer rubber
EBA=ethylene-butyl-acrylate copolymer
pBA=polybutylacrylate
PP=polypropylene The COPE elastomer grade chosen was HYTREL G3548W which melting point is 156° C., hardness 35 Shore D, tensile strength 10.3 MPa and elongation 200%.

The TPU elastomer grades chosen were ESTANE 58206 (polyester type) and ESTANE 58300 (polyether type). ESTANE 58206 hardness is 85A, tensile strength 45 MPa and elongation 550%. ESTANE 58300 softening temperature is 76° C., hardness 80A, tensile strength 32 Mpa and elongation 700%.

The TPV elastomer grades chosen were SANTOPRENE 210–64 and 210–80. SANTOPRENE 210–64 hardness is 64A, tensile strength 6.9 MPa and elongation 330%. SANTOPRENE 210–80 hardness is 80A, tensile strength 11.0 MPa and elongation 450% (values are from a brochure of AES).

The SEBS elastomer grade chosen was KRATON G 1652 which hardness is 75A, tensile strength 31 MPa and elongation 500% (values are from Shell's brochure).

The silicon elastomer grade chosen was the two components castabile grade SILOPREN LSR 2050 which hardness is about 50A, tensile strength about 30 MPa and elongation about 500% (values are from Bayer's brochure).

Optatech's (Neste's) thermoplastic polyolefin elastomers belong to the same class of TPE grades as SANTOPRENE, except the manufacturing technique is different and the EPDM elastomer is replaced by polyacrylate rubber (pBA). The TPE elastomer matrix EBA/pBA hardness is 73A and tensile strength 5 Mpa. The TPE elastomer matrix PP/pBA hardness is 86A and tensile strength 7 Mpa.

The intrinsically conductive thermoplastic component (component b) is Panisol®, trademark of Neste Oy. Panisol (enclosed named as PANI) is a melt processed product of polyaniline and dodecylbenzenesulphonic acid (DBSA). The melt processed product of a mixture of zincoxide/DBSA is named HC PANI.

2. Processing Conditions

The blending was made with a Brabender twoscrew extruder. The raw materials were dried in a drier over night at 75° C. and then dryblended.

In the first test the suitable process conditions for processing HYTREL G3548W was found out. The processing temperatures were found out to be 165° C. for zone I, 170° C. for zone II and 180° C. for zone III, when the speed of screw rotation was 25 1/min.

In the second test the conditions for processing PANI complex and COPE was found out. In the test 20 w-% PANI complex was blended with 80 w-% HYTREL G3548W. The processing temperatures were 165° C. in zone I, 170° C. in zone II and 180° C. in zone III, when the screw speed was 25 1/min.

In the third test the suitable processing conditions for blending HC PANI complex and COPE was found out. In the test 20 w-% HC PANI complex was blended with 80 w-% HYTREL G3548W. At first the processing temperatures were 165° C. in zone I, 170° C. in zone II and 180° C. in zone III, when the screw speed was 25 1/min. Because HC PANI was plasticizing the blend, it came out as a melt and the processing temperatures were changed to 145° C. for zone I, 150° C. for zone II and 150° C. for zone III, when the screw speed was 20 1/min.

In the fourth test the conditions for processing KRATON G 1652 was found out. The suitable processing temperatures were found out as 170° C. for zone I, 180° C. for zone II and 190° C. for zone III, when the screw speed was 20 1/min. When the screw speed was higher the product started to darken and the die blocked.

In the fifth test the suitable conditions for processing PANI complex and KRATON G 1652 was found out. In the test 20 w-% PANI complex was blended with 80 w-% KRATON G 1652. The processing temperatures were 170° C. in zone I, 190° C. in zone II and 200° C. in zone III, when the screw speed was 40 1/min. The changes of conditions were made to get the product out from the screw with as good quality as possible.

In the sixth test the suitable conditions for processing HC PANI complex and KRATON G 1652 was found out. In the test 20 w-% HC PANI complex was blended with 80 w-% KRATON G 1652. The suitable processing temperatures were found out as 180° C. for zone I, 190° C. for zone II and 200° C. for zone III, when the screw speed was 40 1/min.

The two components SILOPREN LSR-SILICONE blending was made with a mixer and BRABENDER PLASTI- CORDER extruder. In the test of SILOPREN PANI complex was added to the premixed components and to both component before final blending and crosslinking. The rest of the tests, including the samples of OPTATECH's TPE (PACREL®), were made with a Klöckner-Ferromatic/Eimotekniikka extruder which was also used for injection moulding of the samples. Processing conditions and settings are shown in Appendix 1–5.

The EBA/pBA and PP/pBA samples were predried for five hours at 70° C. before blending.

3. Results

Results are shown in Table 1 and Table 2.

TABLE 1

| | Conductivity S/cm, 4-point | | | Tensile strength, Mpa | | |
|---|---|---|---|---|---|---|
| Ex. | 10 w-% PANI | 20 w-% PANI | 30 w-% PANI | 10 w-% PANI | 20 w-% PANI | 30 w-% PANI |
| 1 | no conductivity | no conductivity | no conductivity | – | – | – |
| 2 | no conductivity | no conductivity | 8.42 E-7 | – | 0 | 0 |
| 3 | | 6.0 E-8 | 2.9 E-3 | – | 2.7 | 2.5 |
| 4 | 2.2 E-4 | 2.2 E-3 | | 7.6 | 3.2 | – |
| 5 | no conductivity | no conductivity | no conductivity | – | – | – |
| 6a | 2.7 E-6 | 1.3 E-4 | 6.74 E-4 | 2.7 | 1.9 | 1.5 |
| 6b | 4.3 E-5 | 5.0 E-4 | | — | — | — |

Example
1. Hytrel: copolyester (COPE)
2. Estane: polyurethane (TPU)
3. Santoprene 64; PP/EPDM (TPY)
4. Kraton G: styrene block copolymer (SEBS)
5. Silopren LSR: silicone rubber (MQ)
6a. Neste poly(ethylene-co-butyl-acrylate)/polybutylacrylate (PACREL® P6)
6b. Neste polypropylene PP/polybutylacrylate (PACREL® 122)
Conductive polymer component Panisol® (PANI)
E-x means $10^{-x}$ A Brabender twinscrew extruder was not suitable for blending PANI complex and SEBS elastomer, because the conductivity of the product was bad and the mixing poor. The shear forces of the screw were not high enough for the PANI complex.

Because of that the rest of the tests were made with the Klöckner-Ferromatic /Eimotekniikka extruder in Tarmola.

In the tests 1104_1–3 a conductivity of 2.1 E-3 S/cm was achieved with a 20 w-% PANI complex concentration in the four point measurement of a blend of SEBS KRATON G (See Appendix I and FIG. 1). And in the tests 1104_4–6 a conductivity of 2.2 E-4 S/cm with 10 w-% PANI complex concentration in the SEBS blend. The complex concentration had not a remarkable affect on the conductivity. In the tests 1204_1,2,4 a conductivity of 1.9 E-3 S/cm was achieved for a 20 w-% HC PANI complex a concentration in a blend of SEBS.

According to the mechanical properties of the tests (Appendix I) the hardness of SEBS increased 5 ShA with 10% of PANI and 6–7 ShA with 20%. The tensile strength and elongation results changed by 10% from 18 MPa (Note manufacturer's results) to 8 Mpa (measured after processing) and by 20% addition from 3 to 5 Mpa which is a too big change for some applications.

In the test 1204 (180° C., 50 rpm) the best conductivity of 1.0 E-5 S/cm (see App. 2) was achieved with a 30 w-% PANI complex concentration in a blend of HYTREL COPE. The blend was not conducting if the processing temperature was 160° C. or less. It was not conducting if normal PANI complex was used or if the concentration was less than 20%. The hardness of HYTREL was decreased a little after adding PANI. Tensile strength and elongation was decreased so much that it will not meet typical specifications of HYTREL. These properties can be increased by optimizing the process conditions. The complex type and concentration had a strong effect on the conductivity of a blend of SANTOPRENE TPV (see Appendix 3 and FIG. 2). In the tests 1504_13–15 the best conductivity of 5.0 E-3 S/cm was achieved with a 30 w-% HC PANI complex concentration in a blend of SANTOPRENE and in tests 1504_16–18 a

TABLE 2

| | Conductivity S/cm, 4-point | | | Tensile strength, Mpa | | |
|---|---|---|---|---|---|---|
| Ex | 10 w-% HCPANI | 20 w-% HCPANI | 30 w-% HCPANI | 10 w-% HCPANI | 20 w-% HCPANI | 30 w-% HCPANI |
| 7 (1) | | 4.84 E-9 | 6.39 E-8 | — | 2.8 | 2.8 |
| 8 (2) | no conductivity | no conductivity | no conductivity | — | — | — |
| 9 (3) | <1.0 E-12 | 2.65 E-3 | 4.95 E-3 | 3.2 | 2.3 | 2.6 |
| 10 (4) | | 1.9 E-3 | | — | 4.5 | — |
| 11 (5) | no conductivity | no conductivity | no conductivity | — | — | — |
| 12a (6a) | | 3.4 E-12 | 4.08 E-6 | — | 2.4 | 2.0 |
| 12b (6b) | 4.3 E-5 | 5.0 E-4 | 8.08 E-4 | 5.0 | 3.2 | 2.6 |

Example
7. Hytrel: copolyester (COPE)
8. Estane: polyurethane (TPU)
9. Santoprene 64; PP/EPDM (TPV)
10. Kraton G: styrene block copolymer (SEBS)
11. Silopren LSR: silicone rubber (MQ)
12a. Optatech's poly(ethylene-co-butyl-acrylate)/polybutylacrylate (PACREL® P6)
12b. Optatech's polypropylene/polybutylacrylate (PACREL® 122)
Conductive polymer HC Panisol® (HCPANI):
melt processed product of polyaniline/dodecylbenzenesulphonic acid/zincoxide
E-x means $10^{-x}$ conductivity of 2.7 E-3 S/cm with a 20 w-% HC PANI complex concentration in a blend of SANTOPRENE.

In the tests 1504_1–3 a conductivity of 2.9 E-3 S/cm was achieved with a 30 w-% PANI complex concentration in a blend of TPV and in tests 1504_4–6 a conductivity of 6.0 E-8 S/cm with 20 w-% HC PANI complex concentration in a blend of TPV. The SANTOPRENE hardness increased from 1 to 8 ShA after adding PANI complex. Tensile strength decreased for the grade 201–64 from 5.5 MPa to 2.5–3.0 MPa. Elongation decreased with increasing concentration of PANI, from 200% to 137% with 10% PANI, to 80% with 20% PANI and to 14–40% with 30% PANI. For the SANTOPRENE grade 201–80 tensile strength decreased from 9 Mpa to 3.8–5.0 MPa and elongation decreased the same amount to below 100% compared to the grade.

The blend of PANI complex and TPU elastomer were not conducting (see Appendix 4). In the test 2104–13 the best "conductivity" of 8.4 E-7 S/cm was achieved in a TPU blend. It was "conducting" less if HC PANI or higher concentration was used. Polyurethane samples were too brittle to measure any mechanical properties.

The two component SILOPREN LSR silicone was not made conducting with the methods used. The PANI complex was not mixing well into the silicone pasta and the viscosity increased after adding PANI making the casting impossible. The tests should continue with silicone and different types of PANI complex because conductive silicones have been used in interesting and increasing applications.

Both Optatech's EBA/pBA and PP/pBA grades were made conductive (see Appendix 5 and FIG. 3).

EBA/pBA (PACREL P-6) conductivity was better by using normal PANI complex. With 30% PANI the conductivity was 6.7 E-4 S/cm, 20% PANI 1.3 E-4 S/cm and 10% PANI 2.4 E-6 S/cm. HC PANI grade conductivity was the best 8.1 E-6 with 30% HC PANI concentration (average 4.1 E-6). PACREL P-6 hardness was not affected by adding PANI. Tensile strength decreased with 20 and 30% PANI, but was nearly the same with 10% PANI, which meets the antistatic requirements well.

Polypropene based PP/pBA (PACREL 122) conductivities were with normal PANI complex, 30% concentration 8.1 E-4 S/cm, with 20% 5.0 E-4 S/cm and even with 10% concentration 4.3 E-5 S/cm. HC PANI gave worse conductivities than normal PANI. PACREL 122 hardness was nearly the same after blending, strength decreased remarkable with higher PANI concentration and just a little with 10% concentration.

APPENDIX 1

| Test | Matrix SEBS | Complex | Temperature, °C. | Rotation speed, 1/min | Conductivity 2-point, S/cm | Conductivity 4-point, S/cm | Conductivity 4-point average (S/cm) | Tensile strength (MPa) MD/TD: | Elongation % MD/TD: | Modulus 10% MPa | Modulus 50% MPa | Hardness IRHD/ShA |
|---|---|---|---|---|---|---|---|---|---|---|---|---|
|  | Kraton G 1652 | 0% |  |  |  |  |  | 17.6/20.5 | 370/480 |  |  | 73/75 |
| 1104 1 | Kraton G 1652 | 20 p-% Panisol | 180 | 150 | 3.8 E4 | 1.90 E-03 |  | 2.8 | 124 | 2.5 | 2.5 | 87/81 |
| 1104 2 | Kraton G 1652 | 20 p-% Panisol | 180 | 150 | 8.9 E4 | 2.10 E-03 | 2.17 E-03 | 3.8 | 185 | 2.3 | 2.5 |  |
| 1104 3 | Kraton G 1652 | 20 p-% Panisol | 180 | 150 | 6.7 E4 | 2.50 E-03 |  | 3.1 | 46 | 2.8 |  |  |
| 1104 4 | Kraton G 1652 | 10 p-% Panisol | 180 | 150 | 3.6 E-5 | 1.30 E-04 |  | 7.0 | 257 | 2.3 | 2.8 |  |
| 1104 5 | Kraton G 1652 | 10 p-% Panisol | 180 | 50 | 6.8 E-5 | 2.10 E-04 | 2.70 E-04 | 8.5 | 340 | 2.5 | 3.1 | 87/80 |
| 1104 6 | Kraton G 1652 | 10 p-% Panisol | 180 | 50 | 1.1 E-4 | 3.30 E-04 |  | 7.3 | 286 | 2.9 | 3.1 |  |
| 1104 7 | Kraton G 1652 | 20 p-% Panisol | 180 | 50 | NIA | NIA |  | 2.9 | 73 | 2.1 | 2.9 |  |
| 1104 8 | Kraton G 1652 | 20 p-% Panisol | 180 | 50 | 1.9 E-5 | 6.90 E-04 | 7.75 E-04 | 2.7 | 81 | 1.9 | 2.7 |  |
| 1104 9 | Kraton G 1652 | 20 p-% Panisol | 180 | 50 | 2.7 E-5 | 8.60 E-04 |  | 3.0 | 103 | 2.1 | 3 | 91/95 |
| 1204 1 | Kraton G 1652 | 20 p-% Panisol | 170 | 50 | (5.6 E-5) | 1.10 E-03 |  | 4.3 | 145 | 2.3 | 3.9 |  |
| 1204 2 | Kraton G 1652 | 20 p-% HC Panisol | 170 | 50 | 2.0 E-4 | 2.60 E-03 | 1.90 E-03 | 4.5 | 171 | 2.5 | 2.7 |  |
| 1204 3 | Kraton G 1652 | 20 p-% HC Panisol | 170 | 50 | (4.5 E-7) | 6.50 E-05 |  | 4.5 | 43 | 3.0 |  |  |
| 1204 4 | Kraton G 1652 | 20 p-% HC Panisol | 170 | 50 | 1.9 E-4 | 2.00 E-03 |  | (9.1) | 282 | 1.8 | 2.6 | 89/92 |

APPENDIX 2

| Test | Matrix | Complex | Temperature °C. | Rotation speed, 1/min | Conductivity 2-point, S/cm | Conductivity 4-point, S/cm | Correlation MD/TD: | Tensile strength MPa | Elongation (%) | Modulus 10% MPa | Modulus 50% MPa | Hardness IRHD/ShA |
|---|---|---|---|---|---|---|---|---|---|---|---|---|
|  | Hytrel 3548 | 0 |  |  |  |  |  | 8.0/12.7 | 99/555 |  |  | 91/89/24 |
| 1104 10 | Hytrel 3548 | 20 p-% Panisol | 170 | 50 | 1.2 E-9 | NIA | V-limit | 3.4 | 58 | 2 | 3.4 | 88/83 |
| 1104 11 | Hytrel 3548 | 20 p-% Panisol | 160 | 50 | 1.2 E-9 | NIA | V-limit | 4.7 | 169 | 2 | 3.7 |  |
| 1104 12 | Hytrel 3548 | 20 p-% Panisol | 150 | 50 | 1.2 E-9 | NIA | V-limit | 5.6 | 198 | 2.2 | 4.1 |  |
| 1104 13 | Hytrel 3548 | 20 p-% HC Panisol | 160 | 50 | 5.1 E-9 | 4.84 E-9 | 0.99883 | 2.8 | 27 | 1.67 |  |  |
| 1204 20 | Hytrel 3548 | 20 p-% HC Panisol | 150 | 50 | 2.2 E-8 | 2.54 E-8 | 0.99746 | 0.34 | 7 | 0.01 |  | 82/73 |
| 1204 5 | Hytrel 3548 | 30 p-% HC Panisol | 160 | 50 | (2.2 E-7) | (6.7 E-7) |  | 2.9 | 22 | 2.5 |  | 90/85 |
| 1204 6 | Hytrel 3548 | 30 p-% HC Panisol | 160 | 50 | 0.60 E-7 | 6.52 E-8 | 0.99692 | 2.7 | 17 | 2.4 |  |  |
| 1204 7 | Hytrel 3548 | 30 p-% HC Panisol | 160 | 50 | 0.57 E-7 | 6.26 E-8 | 0.99611 | 2.9 | 24 | 2.4 |  |  |
| 1204 8 | Hytrel 3548 | 30 p-% HC Panisol | 150 | 50 | 0.22 E-7 | 3.42 E-8 | 0.99652 | 2  4 | 25 | 1.9 |  |  |
| 1204 9 | Hytrel 3548 | 30 p-% HC Panisol | 140 | 50 | 0.25 E-7 | 3.47 E-8 | 0.99754 | 3.3 | 31 | 2.4 |  |  |
| 1204 10 | Hytrel 3548 | 30 p-% HC Panisol | 170 | 50 | 4.9 E-7 | 1.09 E-5 | 0.99991 | 2.7 | 16 | 2.5 |  |  |
| 1204 11 | Hytrel 3548 | 30 p-% HC Panisol | 180 | 50 | 5.0 E-7 | 0.99 E-5 | 0.99999 | 2.5 | 17 | 2.2 |  | 89/81 |
| 1204 12 | Hytrel 3548 | 20 p-% HC Panisol | 180 | 50 | 0.13 E-7 | 1.61 E-8 | 0.99803 | 3 | 36 | 2.2 |  |  |
| 1204 13 | Hytrel 3548 | 20 p-% HC Panisol | 160 | 50 | 0.09 E-7 | 1.74 E-08 | 9.98 E-01 | 3.5 | 51 | 2.4 |  |  |

APPENDIX 2-continued

| Test | Matrix | Complex | Temperature °C. | Rotation speed, 1/min | Conductivity 2-point, S/cm | Conductivity 4-point, S/cm | Correlation MD/TD: | Tensile strength MPa | Elongation (%) | Modulus 10% MPa | Modulus 50% MPa | Hardness IRHD/ShA |
|---|---|---|---|---|---|---|---|---|---|---|---|---|
| 1204 14 | Hytrel 3548 | 20 p-% Panisol | 160 | 50 | 1.9 E-9 | NIA | V-limit | 4.1 | 81 | 2 | 3.8 | |
| 1204 15 | Hytrel 3548 | 20 p-% Panisol | 160 | 50 | 1.4 E-9 | NIA | V-limit | 5.1 | 158 | 2 | 3.8 | |
| 1204 16 | Hytrel 3548 | 20 p-% Panisol | 160 | 50 | 2.0 E-9 | NIA | V-limit | 4.8 | 215 | 1.8 | 3.5 | 87/84 |
| 1204 17 | Hytrel 3548 | 30 p-% Panisol | 170 | 50 | 2.0 E-9 | NIA | V-limit | 3.6 | 125 | 1.7 | | |
| 1204 18 | Hytrel 3548 | 30 p-% Paniso1 | 170 | 50 | 2.0 E-9 | NIA | V-limit | 4.4 | 214 | 1.8 | 3.2 | |
| 1204 19 | Hytrel 3548 | 30 p-% Panisol | 180 | 50 | 1.9 E-9 | NIA | V-limit | 4.2 | 209 | 1.8 | 3.2 | 85/80 |

APPENDIX 3

Matrixes: Santoprene 201-64
Santoprene 201-80
Complexes: Panisol
HC Panisol

| Test | Elastomer matrix | Panisol-complex | Temperature, °C. | Rotation speed 1/min | Conductivity 2-point S/cm | Conductivity 4-point S/cm | Tensile strength MPa | Elongation % | Modulus 10% MPa | Modulus 50% MPa | Hardness IRHD/ShA |
|---|---|---|---|---|---|---|---|---|---|---|---|
| | 201-64 | 0% | | | | | 4.9/6.1 | 90/300 | | | 72/70 |
| 1504 1 | 201-64 | 30 p-% | 180 | 150 | 2.42 E-3 | | 2.5 | 40 | 1.8 | | 78/72 |
| 1504 2 | 201-64 | 30 p-% | 180 | 150 | 3.51 E-3 | | 2.4 | 35 | 1.9 | | |
| 1504 3 | 201-64 | 30 p-% | 180 | 150 | 2.67 E-3 | | 2.5 | 38 | 1.9 | | |
| 1504 4 | 201-64 | 20 p-% | 180 | 150 | 6.15 E-8 | | 2.7 | 83 | 1.6 | 2.5 | 78/72 |
| 1504 5 | 201-64 | 20 p-% | 180 | 150 | 7.31 E-8 | | 2.6 | 77 | 1.7 | 2.5 | |
| 1504 6 | 201-64 | 20 p-% | 180 | 150 | 4.40 E-8 | | 2.8 | 85 | 1.6 | 2.5 | 77/71 |
| 1504 13 | 201-64 | 30 p-% HC | 180 | 150 | 4.63 E-3 | | 2.6 | 17 | 2.3 | | 79/78 |
| 1504 14 | 201-64 | 30 p-% HC | 180 | 150 | 4.46 E-3 | | 2.6 | 18 | 2.3 | | |
| 1504 15 | 201-64 | 30 p-% HC | 180 | 150 | 5.78 E-3 | | 2.5 | 17 | 2.3 | | 78/77 |
| 1504 16 | 201-64 | 20 p-% HC | 180 | 150 | 2.49 E-3 | | 2.4 | 30 | 1.9 | | 78/74 |
| 1504 17 | 201-64 | 20 p-% HC | 180 | 150 | 2.85 E-3 | | 2.3 | 55 | 1.8 | 0.8 | |
| 1504 18 | 201-64 | 20 p-% HC | 180 | 150 | 2.62 E-3 | | 2.1 | 44 | 1.1 | | 77/72 |
| 1504 19 | 201-64 | 10 p-% HC | 180 | 150 | <1.0 E-12 | | 3.2 | 137 | 2.2 | 1.1 | 71/67 |
| 1504 20 | 201-64 | 15 p-% HC | 180 | 150 | 7.57 E-8 | | 2.5 | 81 | 2.4 | 1.5 | ? |
| 2004-15 | 201-64 | 15 p-% HC | | | | | 2.5 | 71 | 1.6 | | |
| 2004-16 | 201-64 | 15 p-% HC | | | | | 2.2 | 59 | 1.6 | | |
| | 201-80 | 0% | | | | | 8.4/10.8 | 90/360 | | | 90/90 |
| 1504 7 | 201-80 | 30 p-% | 180 | 150 | (9.16 E-8) | | 4.5 | 38 | 3.7 | | 84/84 |
| 1504 8 | 201-80 | 30 p-% | 180 | 150 | 1.89 E-3 | | 4.3 | 40 | 3.7 | | |
| 1504 9 | 201-80 | 30 p-% | 180 | 150 | 1.46 E-3 | | 4.3 | 45.6 | 3.7 | | |
| 1504 10 | 201-80 | 20 p-% | 180 | 150 | 4.88 E-8 | | 4.3 | 52 | 3.4 | 3.5 | |
| 1504 11 | 201-80 | 20 p-% | 180 | 150 | 5.26 E-8 | | 4.4 | 79 | 3.5 | 4.3 | |
| 1504 12 | 201-80 | 20 p-% | 180 | 150 | 6.81 E-8 | | 4.9 | 84.7 | 3.4 | 4.8 | 91/85 |
| 2004-1 | 201-80 | 30 p-% HC | | | | | 4 | 28 | 3.8 | | |
| 2004-2 | 201-80 | 30 p-% HC | | | | | 3.9 | 11 | 3.1 | | |
| 2004-12 | 201-80 | 30 p-% HC | | | | | 3.8 | 13 | 3.7 | | |
| 2004-3 | 201-80 | 20 p-% HC | | | | | 4 | 35 | 3.6 | | |
| 2004-4 | 201-80 | 20 p-% HC | | | | | 3.9 | 33 | 3.6 | | |
| 2004-5 | 201-80 | 20 p-% HC | | | | | 4 | 40 | 3.5 | | |

APPENDIX 4

Matrixes: Estane 53300
Estane 58260
Complexes: Panisol
HC Panisol

| Test | Elastomer-matrix | Panisol-complex | Temperature, °C. | Rotation speed 1/min | Conductivity 2-point S/cm | Conductivity 4-point S/cm | Tensile strength MPa | Modulus 10% MPa | Modulus 50% MPa | Elongation % | Hardness IRHD/ShA |
|---|---|---|---|---|---|---|---|---|---|---|---|
| Manufact. | 53300 | 0% | | | | | 32 | | | 700 | 80 ShA |
| 2104 1 | 53300 | 30 p-% | 180 | 150 | 5.70 E-13 | NIA | NIA | NIA | NIA | NIA | 84/79 |
| 2104 2 | 53300 | 30 p-% | 170 | 150 | 4.70 E-13 | NIA | NIA | NIA | NIA | NIA | 78/75 |
| 2104 3 | 53300 | 30 p-% | 160 | 150 | 4.30 E-13 | NIA | NIA | NIA | NIA | NIA | 77/75 |

APPENDIX 4-continued

Matrixes: Estane 53300, Estane 58260
Complexes: Panisol, HC Panisol

| Test | Elastomer-matrix | Panisol-complex | Temperature, °C. | Rotation speed 1/min | Conductivity 2-point S/cm | Conductivity 4-point S/cm | Tensile strength MPa | Modulus 10% MPa | Modulus 50% MPa | Elongation % | Hardness IRHD/ShA |
|---|---|---|---|---|---|---|---|---|---|---|---|
| 2104 4 | 53300 | 30 p-% | 150 | 150 | 3.30 E-13 | NIA | NIA | NIA | NIA | NIA | 80/74 |
| 2104 5 | 53300 | 30 p-% HC | 150 | 150 | 3.10 E-10 | NIA | NIA | NIA | NIA | NIA | 84/81 |
| 2104 6 | 53300 | 30 p-% HC | 160 | 150 | 4.90 E-10 | NIA | NIA | NIA | NIA | NIA | 88/82 |
| 2104 7 | 53300 | 30 p-% HC | 170 | 150 | 2.40 E-11 | NIA | NIA | NIA | NIA | NIA | 83/80 |
| 2104 8 | 53300 | 30 p-% HC | 180 | 150 | 2.56 E-11 | NIA | NIA | NIA | NIA | NIA | 79/83 |
| 2104 9 | 58206 | 30 p-% HC | 180 | 150 | 1.96 E-09 | NIA | NIA | NIA | NIA | NIA | 92/93 |
| 2104 10 | 58206 | 30 p-% HC | 190 | 150 | 3.68 E-08 | NIA | NIA | NIA | NIA | NIA | 94/94 |
| 2104 11 | 58206 | 30 p-% HC | 170 | 150 | 1.33 E-03 | NIA | NIA | NIA | NIA | NIA | 89/92 |
| 2104 12 | 58206 | 30 p-% | 180 | 150 | 3.33 E-07 | NIA | NIA | NIA | NIA | NIA | 90/90 |
| 2104 13 | 58206 | 30 p-% | 180 | 150 | 8.42 E-07 | NIA | NIA | NIA | NIA | NIA | 89/89 |
| 2104 14 | 58206 | 30 p-% HC | 180 | 150 | 7.65 E-08 | NIA | NIA | NIA | NIA | NIA | —/96 |
| 2104 15 | 58206 | 30 p-% HC | 170 | 150 | 1.08 E-08 | NIA | NIA | NIA | NIA | NIA | 92/91 |

APPENIX 5

PACREL P6
PACREL 122

| Complexes Test | Panisol HC Panisol Elastomer-matrix | Panisol-complex | Temperature, °C. | Rotation speed, 1/min | Conductivity 4-point, S/cm | Tensile strength MPa | Modulus 10% MPa | Modulus 50% MPa | Elongation % | Hardness IRHD/ShA |
|---|---|---|---|---|---|---|---|---|---|---|
| EBA/pBA | PACREL P6 | 0 | 180 | 150 |  | 3,1 | 1,1 | 2,6 | 82 | 67/73 |
| EBA/pBA | PACREL P6 | 0 | 180 | 150 |  | 3,1 | 1,1 | 2,6 | 79 | 75/73 |
| EBA/pBA | PACREL P6 | 0 | 180 | 150 |  | 3,2 | 1,1 | 2,7 | 89 | 76/73 |
| 2405 1 | PACREL P6 | 30 pt-% | 180 | 150 | 1,30E-03 | 1,5 | — | — | 9 | 74/71 |
| 2405 2 | PACREL P6 | 30 pt-% | 180 | 150 | 3,51E-04 | 1,5 | — | — | 7 |  |
| 2405 3 | PACREL P6 | 30 pt-% | 180 | 150 | 3,72E-04 | 1,6 | — | — | 7 |  |
| 2405 4 | PACREL P6 | 20 pt-% | 180 | 150 | 1,37E-04 | 1,9 | 1,7 | — | 21 | 74/73 |
| 2405 5 | PACREL P6 | 20 pt-% | 180 | 150 | 1,19E-04 | 2 | 1,6 | — | 28 |  |
| 2405 6 | PACREL P6 | 20 pt-% | 180 | 150 | 1,39E-04 | 2 | 1,6 | — | 30 |  |
| 2405 7 | PACREL P6 | 10 pt-% | 180 | 150 | 5,45E-06 | 2,9 | 1,2 | 2,6 | 87 | 75/72 |
| 2405 8 | PACREL P6 | 10 pt-% | 180 | 150 | 1.69E-06 | 2,5 | 1,1 | 2,3 | 78 |  |
| 2405 9 | PACREL P6 | 10 pt-% | 180 | 150 | 1,03E-6 | 2,7 | 1,2 | 2,5 | 79 |  |
| 2405 10 | PACREL P6 | 30 pt-% HC | 180 | 150 | 1,77E-06 | 2 | 1,4 | 2 | 65 | 79/74 |
| 2405 11 | PACREL P6 | 30 pt-% HC | 180 | 150 | 8,10E-06 | 2 | 1,4 | 2 | 60 |  |
| 2405 12 | PACREL P6 | 30 pt-% HC | 180 | 150 | 2,36E-06 | 2 | 1,4 | 2 | 71 |  |
| 2405 13 | PACREL P6 | 20 pt-% HC | 180 | 150 | 3,48E-12 | 2,4 | 1,2 | 2,2 | 88 | 77/72 |
| 2405 14 | PACREL P6 | 20 pt-% HC | 180 | 150 | 3,26E-12 | 2,4 | 1,3 | 2,3 | 67 |  |
| 2405 15 | PACREL P6 | 20 pt-% HC | 180 | 150 | 3,47E-12 | 2,3 | 1,2 | 2,1 | 90 |  |
| | | | | | | | | | | ShD |
| PP/pA | PACREL 122 | 0 | 180 | 150 |  | 6 | 3,1 | — | 47 | 25 |
| PP/pA | PACREL 122 | 0 | 180 | 150 |  | 6,5 | 3 | 6,2 | 54 |  |
| PP/pA | PACREL 122 | 0 | 180 | 150 |  | 6,5 | 3,5 | — | 47 |  |
| 1905 1 | PACREL 122 | 30 pt-% | 180 | 150 | 7,71E-04 |  |  |  |  |  |
| 1905 2 | PACREL 122 | 30 pt-% | 180 | 150 | 1,32E-3 | 2,6 | — | — | 5 | 22 |
| 1905 3 | PACREL 122 | 30 pt-% | 180 | 150 | 3,34E-04 |  |  |  |  |  |
| 1905 4 | PACREL 122 | 20 pt% | 180 | 150 | 4,01E-04 |  |  |  |  |  |
| 1905 5 | PACREL 122 | 20 pt-% | 180 | 150 | 5,49E-04 | 2,8 | — | — | 5 | 22 |
| 1905 6 | PACREL 122 | 20 pt-% | 180 | 150 | 5,51E-04 | 3,5 | 3,3 | — | 14 |  |
| 1905 7 | PACREL 122 | 10 pt-% | 180 | 150 | 5,05E-05 | 4,9 | 3,1 | — | 38 | 23 |
| 1905 8 | PACREL 122 | 10 pt-% | 180 | 150 | 4,81E-05 | 5,1 | 3 | — | 40 |  |
| 1905 9 | PACREL 122 | 10 pt-% | 180 | 150 | 3,04E-05 | 5,1 | 3 | — | 44 |  |
| 2405 16 | PACREL 122 | 30 pt-% HC | 180 | 150 | 7,53E-04 | 2,8 | 1,3 | — | 9 | 24 |
| 2405 17 | PACREL 122 | 30 pt-% HC | 180 | 150 | 2,19E-04 | 3,4 | 3,2 | — | 14 |  |
| 2405 18 | PACREL 122 | 30 pt-% HC | 180 | 150 | 2,10E-04 | 3,5 | 3,2 | — | 15 |  |
| 2405 19 | PACREL 122 | 20 pt-% HC | 180 | 150 | 3,63E-10 | 3,9 | 3,2 | — | 18 | 22 |
| 2405 20 | PACREL 122 | 20 pt-% HC | 180 | 150 | 7,22E-10 | 3,9 | 2,9 | — | 27 |  |
| 2405 21 | PACREL 122 | 20 pt-% HC | 180 | 150 | 1,04E-10 | 4,1 | 3,1 | — | 27 |  |

We claim:

1. An electrically conductive thermoplastic elastomer blend, characterized in that it comprises
   a) above 10 to 99 w-% of a thermoplastic elastomer component which has been chosen from the following types
      An A-B-A type of styrene block copolymer in which A stands for a polystyrene block and B stands for a soft or elastic polymer block;
      A blend of an olefin homopolymer or olefin copolymer and a crosslinked elastomer and
   b) about 90–1 w-% of an inherently electrically conductive polymer component, which is composed of polyaniline or its derivative which has been doped by a protonic acid.

2. An electrically conductive thermoplastic elastomer blend according to claim 1, characterized in that the portion of component b) is about 90–5 w-%.

3. An electrically conductive thermoplastic elastomer blend according to claim 2, wherein the portion of component b) is about 40–10 w-%.

4. An electrically conductive thermoplastic elastomer blend according to claim 1, characterized in that the elastomer component a) is an A-B-A type of styrene block copolymer in which A is a polystyrene block and B is a poly(ethylene-co-butylene) block (SEBS).

5. An electrically conductive thermoplastic elastomer blend according to claim 1, characterized in that the elastomer component a) is a blend of propylene homopolymer and ethylene-propylene-diene rubber (EPDM) in which the rubber is crosslinked (vulcanized).

6. An electrically conductive thermoplastic elastomer blend according to claim 1, characterized in that the elastomer component a) has been chosen from the following types: a blend of poly(ethylene-co-vinylacetate) and acrylate rubber; a blend of poly (ethylene-co-butylacrylate) and acrylate rubber; a blend of linear low density polyethylene (LLDPE) and acrylate rubber; a blend of polypropylene random copolymer and acrylate rubber.

7. An electrically conductive thermoplastic elastomer blend according to claim 5, characterized in that the acrylic rubber in the elastomer component a) is a $C_1$–$C_{12}$-alkylacrylate polymer or a $C_4$–$C_{14}$-alkylmethacrylate polymer, with a glass transition temperature below +20° C.

8. An electrically conductive thermoplastic elastomer blend according to claim 5, characterized in that the acrylate rubber in the elastomer component a) represents 20–90 w-% of the blend.

9. An electrically conductive thermoplastic elastomer blend according to claim 6, wherein the acrylate rubber is made in situ and crosslinked.

10. An electrically conductive thermoplastic elastomer blend according to claim 6, characterized in that the acrylic rubber in the elastomer component a) is a $C_2$–$C_{12}$-alkylacrylate polymer or a $C_8$–$C_{14}$-alkylmethacrylate polymer.

11. An electrically conductive thermoplastic elastomer blend according to claim 6, wherein the acrylic rubber in the elastomer component a) has a glass transition temperature below −20° C.

12. An electrically conductive thermoplastic elastomer blend according to claim 6, characterized in that the acrylic rubber in the elastomer component a) is an ethylhexylacrylate polymer or a butyl-acrylate polymer.

13. An electrically conductive thermoplastic elastomer blend according to claim 1, characterized in that the inherently electrically conductive polymer component b) is composed of the emeraldine base polyaniline which has been doped with a protonic acid.

14. An electrically conductive thermoplastic elastomer blend according to claim 1, characterized in that the inherently electrically conductive polymer component b) is polyaniline or its derivative, which has been doped with a protonic acid which is an organic sulphonic acid.

15. An electrically conductive thermoplastic elastomer blend according to claim 14, wherein the organic sulphonic acid is an aromatic sulphonic acid.

16. An electrically conductive thermoplastic elastomer blend according to claim 15, wherein the aromatic sulphonic acid is dodecyl-benzene sulphonic acid.

17. An electrically conductive thermoplastic elastomer blend according to claim 1, characterized in that the inherently electrically conductive polymer component b) is a product made from polyaniline or its derivative and a protonic acid and which has been made by contacting polyaniline or its derivative and the protonic acid under high shear forces at a temperature of about 80–250° C.

18. An electrically conductive thermoplastic elastomer blend according to claim 17, wherein the polyaniline or its derivative and the protonic acid are contacted by mixing in melt compounding equipment.

19. An electrically conductive thermoplastic elastomer blend according to claim 1, characterized in that the inherently electrically conductive polymer component b) also, comprises a metal compound.

20. An electrically conductive thermoplastic elastomer blend according to claim 19, wherein the metal compound is a metal salt or a reaction product of a metal oxide or metal hydroxide and a protonic acid.

21. An electrically conductive thermoplastic elastomer blend according to claim 20, wherein the metal compound is the reaction product of zinc oxide and dodecyl-benzene sulphonic acid.

22. An electrically conductive thermoplastic elastomer blend according to claim 1, characterized in that it has been obtained by melt processing the thermoplastic elastomer component a) and the inherently electrically conductive polymer component b).

23. An electrically conductive thermoplastic elastomer blend according to claim 12, characterized in that it has been obtained by melt processing a thermoplastic elastomer component a) which is a named A-B-A type of styrene block copolymer and the inherently electrically conductive polymer component b) using an extruder with a temperature of about 160°–210° C.

24. An electrically conductive thermoplastic elastomer blend according to claim 23, wherein the extruder has a screw rotation speed of about 40–170 l/min.

25. An electrically conductive thermoplastic elastomer blend according to claim 12, characterized in that it has been obtained by melt processing a thermoplastic elastomer component a) which is a blend of an olefin homopolymer or olefin copolymer with a thermoplastic or crosslinked elastomer, and an inherently electrically conductive polymer component b) using an extruder with a temperature of about 165–220° C.

26. An electrically conductive thermoplastic elastomer blend according to claim 25, wherein the extruder has a screw rotation speed of about 50–200 l/min.

27. An antistatic material and/or EMI shielding material comprising an electrically conductive thermoplastic elastomer blend according to claim 1.

28. An electrically conductive thermoplastic elastomer blend according to claim 1, wherein the olefin is ethylene or propylene.

29. An electrically conductive thermoplastic elastomer blend according to claim 1, wherein the A-B-A-type styrene block copolymer is present in an amount of 60–90 w-%.

* * * * *

UNITED STATES PATENT AND TRADEMARK OFFICE
CERTIFICATE OF CORRECTION

PATENT NO. : 5,993,696

DATED : November 30, 1999

INVENTOR(S) : Kalle Hanhi et al.

It is certified that error appears in the above-identified patent and that said Letters Patent is hereby corrected as shown below:

In Column 17, line 39 (claim 7, line 2): change "claim 5" to --claim 6--.

In Column 17, line 44 (claim 8, line 2): change "claim 5" to --claim 6--.

In Column 18, line 38 (claim 23, line 2): change "claim 12" to --claim 22--.

In Column 18, line 48 (claim 25, line 2): change "claim 12" to --claim 22--.

Signed and Sealed this

Fifteenth Day of August, 2000

Attest:

Q. TODD DICKINSON

*Attesting Officer*  *Director of Patents and Trademarks*